US007350704B2

(12) United States Patent
Barsness et al.

(10) Patent No.: US 7,350,704 B2
(45) Date of Patent: Apr. 1, 2008

(54) HANDHELD ELECTRONIC BOOK READER WITH ANNOTATION AND USAGE TRACKING CAPABILITIES

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/465,658

(22) Filed: Aug. 18, 2006

(65) Prior Publication Data

US 2006/0282797 A1    Dec. 14, 2006

Related U.S. Application Data

(62) Division of application No. 09/951,363, filed on Sep. 13, 2001, now Pat. No. 7,103,848.

(51) Int. Cl.
*G06K 7/00* (2006.01)

(52) U.S. Cl. ............... 235/435; 235/375; 707/104.2

(58) Field of Classification Search ............ 235/438, 235/375, 485–487, 472.01; 707/104.1, 102; 345/156; 434/317
See application file for complete search history.

(56) References Cited

U.S. PATENT DOCUMENTS

| 5,663,748 | A | | 9/1997 | Huffman et al. | |
|---|---|---|---|---|---|
| 5,697,793 | A | | 12/1997 | Huffman et al. | |
| 5,761,485 | A | | 6/1998 | Munyan | |
| 5,893,132 | A | | 4/1999 | Huffman et al. | |
| 6,085,204 | A | | 7/2000 | Chijiwa et al. | |
| 6,091,930 | A | * | 7/2000 | Mortimer et al. | ............ 434/362 |
| 6,529,215 | B2 | | 3/2003 | Golovchinsky et al. | |
| 6,597,314 | B1 | * | 7/2003 | Beezer et al. | ............... 715/812 |
| 6,714,214 | B1 | | 3/2004 | DeMello et al. | |
| 6,845,369 | B1 | | 1/2005 | Rodenburg | |
| 7,020,663 | B2 | * | 3/2006 | Hay et al. | ................ 707/104.1 |
| 7,111,774 | B2 | * | 9/2006 | Song | .......................... 235/375 |
| 2001/0007980 | A1 | * | 7/2001 | Ishibashi et al. | ............. 705/26 |
| 2002/0013816 | A1 | * | 1/2002 | Hori | .......................... 709/204 |

(Continued)

OTHER PUBLICATIONS

Camarda, Bill, "Using Microsoft Word 97" 1997.

*Primary Examiner*—Thien M. Le
*Assistant Examiner*—Edwyn Labaze
(74) *Attorney, Agent, or Firm*—Wood, Herron & Evans, LLP (57) ABSTRACT

A handheld electronic book reader, program product, and method incorporate enhanced annotation and/or usage tracking capabilities. Users may create "contexts" for defined terms in an electronic document. Moreover, annotation data such as contexts, comments and highlighting may be associated with various users, and displayed in connection with the display of an electronic document so as to indicate that different annotation data has been originated by different users. In addition, from the standpoint of usage tracking, usage statistics for an electronic document displayed in a handheld electronic reader may be generated on a page-by-page basis, and/or in association with term definitions. Moreover, usage statistics for multiple users may be combined and analyzed. Through such analysis, the usage statistics may be used in the conduct of various beneficial actions such as revising an electronic document, revising a lesson plan with which an electronic document is associated, determining whether a user has read a selected portion of an electronic document, or determining whether a user needs supplemental assistance.

10 Claims, 4 Drawing Sheets

U.S. PATENT DOCUMENTS

| | | |
|---|---|---|
| 2002/0035697 A1* | 3/2002 | McCurdy et al. ............ 713/200 |
| 2002/0133464 A1* | 9/2002 | Ress et al. .................... 705/51 |
| 2003/0018663 A1* | 1/2003 | Cornette et al. ......... 707/500.1 |
| 2003/0210226 A1* | 11/2003 | Ho et al. ..................... 345/156 |
| 2004/0044697 A1* | 3/2004 | Nixon ........................ 707/200 |
| 2004/0049571 A1* | 3/2004 | Johnson et al. ............. 709/224 |
| 2004/0158612 A1* | 8/2004 | Concannon ................. 709/206 |
| 2005/0104866 A1* | 5/2005 | Inui ............................ 345/173 |
| 2005/0188306 A1* | 8/2005 | Mackenzie .................. 715/530 |
| 2007/0026371 A1* | 2/2007 | Wood ......................... 434/317 |

* cited by examiner

HANDHELD ELECTRONIC BOOK READER WITH ANNOTATION AND USAGE TRACKING CAPABILITIES

CROSS-REFERENCE TO RELATED APPLICATION

The application is a divisional of U.S. application Ser. No. 09/951,363 filed on Sep. 13, 2001 now U.S. Pat. No. 7,103,848 by Eric Lawrence Barsness et al., which application is incorporated by reference herein in its entirety.

FIELD OF THE INVENTION

The invention is generally related to computers and computer software, and in particular to handheld electronic book readers.

BACKGROUND OF THE INVENTION

Computer technology has had an important impact on the dissemination of knowledge, e.g., for entertainment, education and informational purposes. For example, classrooms increasingly are outfitted with computers and Internet connections to facilitate the learning process for students of all ages. Moreover, computer-assisted learning techniques have been developed to facilitate student comprehension of educational subject matter.

In addition, computer technology advances, in particular related to reducing the size and increasing the complexity of electronics, have permitted computers to be packaged into smaller and more powerful devices. Due to such advances, many handheld devices such as Personal Digital Assistants (PDA's) and the like now have memory capacities and performance comparable to the full size computers of only a few years ago. Among other uses, PDA's and the like can be used by students to store notes, documents, reference materials, class schedules, etc.

Another type of handheld device that has been developed is a dedicated handheld electronic book reader, which attempts to mimic the experience of reading a paper book through the display of electronic information on one or more electronic displays. Electronic documents, often referred to as electronic books, are stored in the readers and displayed one or two pages at a time. Then through selection of next and previous page buttons, a user is able to flip forward and backward through a book in much the same manner as with a paper book.

Some electronic book readers also support additional value-added features, such as permitting a user to underline or highlight text, scribble handwritten notes in the margins and look up definitions of particular words or terms in a dictionary. In addition, some readers are able to calculate reading pace and elapsed time, and provide information such as the time remaining to complete a book based upon the calculated reading pace of a user.

To date, however, handheld electronic book readers and other handheld devices have been mostly utilized for general entertainment or informational purposes, as the devices have not yet achieved a level of pervasiveness suitable for utilization in a classroom or educational context. However, one can envision a day when all students might carry handheld devices upon which are stored their textbooks and other educational materials, particularly given the likely advances in memory capacities and processing performance of handheld devices.

The promise of using handheld devices such as electronic book readers in educational environments, however, demands a rethinking of many basic educational processes. In other areas, computer technology has enabled increased collaboration and information sharing between students, as well as between an instructor and students. However, to date, handheld devices have been predominantly used as stand-alone devices, and have typically been connected to other computers and devices only when it is desired to download new content. Given, however, the additional capabilities of handheld devices, such as the ability to annotate an electronic book via highlighting and note taking, it is believed that a unique opportunity is presented for increased collaboration between the users of handheld devices. Moreover, it is believed that the ability to monitor the usage of a handheld device may present an instructor with the opportunity to obtain valuable feedback regarding students and their usage of particular electronic books.

Therefore, a significant need has developed for improved collaboration and information sharing tools for use in connection with handheld devices, and in particular, handheld electronic book readers and the like used in educational or classroom environments.

SUMMARY OF THE INVENTION

The invention addresses these and other problems associated with the prior art by providing a handheld electronic book reader, program product, and method incorporating enhanced annotation and/or usage tracking capabilities. While other applications are envisioned, from the standpoint of an educational and/or classroom-type setting, the annotation and usage tracking capabilities described hereinafter provide significant benefits in terms of improving the educational process for both students and instructors alike.

Consistent with one aspect of the invention, annotation of an electronic document via a handheld electronic book reader is enhanced through associating a user-selected portion of an electronic document with a particular defined term in that document to create a "context" for that defined term. As such, a user is able to select contextual examples of the usage of a particular defined term, and store such examples for later retrieval.

Consistent with another aspect of the invention, collaborative annotation functionality is provided, whereby annotation data such as contexts, comments and highlighting for a particular electronic document is associated with various users and displayed in connection with the display of such a document so as to indicate that different annotation data has been originated by different users. Consequently, multiple users are able to collaborate in the annotation of a common electronic document.

Consistent with yet another aspect of the invention, page-based usage statistics may be generated for an electronic document viewed in a handheld electronic book reader. Furthermore, usage statistics may be generated in association with particular term definitions stored in a handheld electronic book reader. Through usage tracking of these particular items, and at this particular level of granularity, more comprehensive and valuable usage statistics may be obtained.

Consistent with an additional aspect of the invention, collaborative usage tracking is provided, whereby usage statistics for multiple users interacting with a particular electronic document on multiple handheld electronic book readers are generated and received into an analysis computer. Moreover, consistent with another aspect of the invention, usage statistics from one or more users may be utilized in performing one or more of revising an electronic document, revising a lesson plan with which an electronic document is associated, determining whether a user has read a selected portion of an electronic document, and determining whether a user needs supplemental assistance.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter focus on improving the functionality and utility of electronic documents, in particular to enhancing the collaborative and annotative capabilities of electronic book readers and like handheld devices, as well as utilizing usage tracking concepts to provide useful feedback on reader usage of electronic documents, e.g., to improve such documents or lesson plans associated with such documents, to monitor student activity, to identify students needing supplemental assistance, etc.

An electronic document may be considered to incorporate practically any content provided in electronic form, be it educational, historical, informational, fictional, non-fictional, technical, entertainment-related, etc. Moreover, an electronic document need not constitute an entire literary work such as a textbook or novel, but may constitute only a portion of a particular literary work or book, as well as a collection of works or books. An electronic document may be specifically formatted for use in connection with a particular hardware platform, or may be platform independent. Thus, the invention is not limited to any particular electronic document implementation discussed herein.

Figure 1:
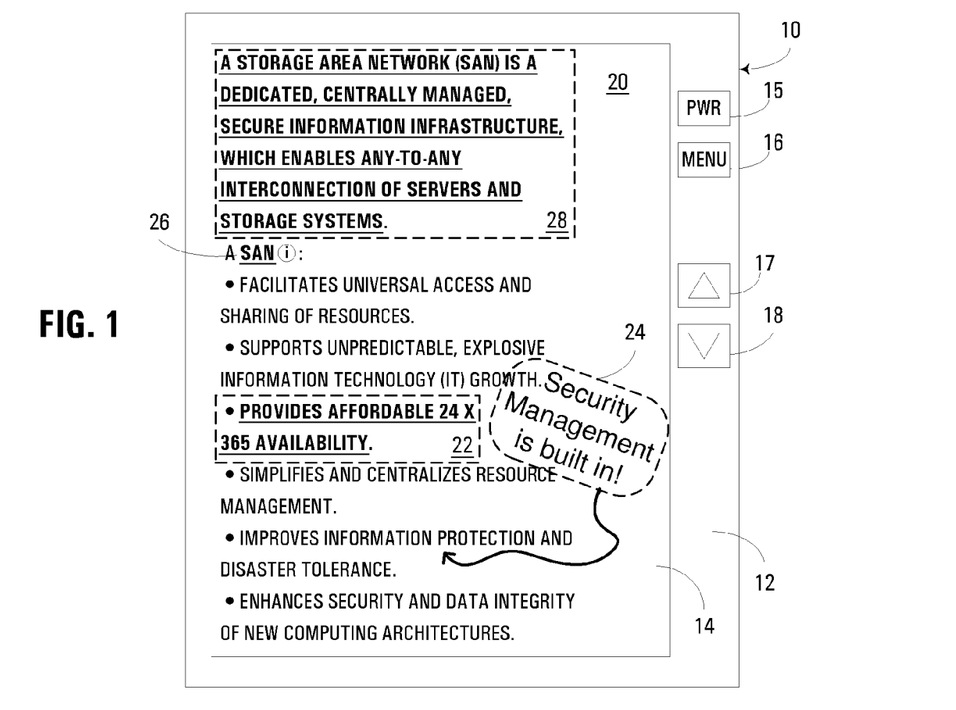
FIG. 1 is a top plan view of a handheld electronic book reader incorporating annotation and usage tracking capabilities consistent with the invention.

Turning now to the Drawings, wherein like numbers denote like parts throughout the several views, FIG. 1 illustrates a handheld electronic book reader 10 consistent with the invention. Reader 10 may be implemented using a dedicated reader that is only suitable for use in displaying electronic books or documents, or may be implemented using other handheld electronic devices that are capable of displaying text and/or images from an electronic document, e.g., personal digital assistants (PDA's), pagers, tablet computers, etc. Generally, a reader 10 includes a housing 12 within which is mounted a touchscreen display 14 and one or more hard buttons, e.g., a power button 15, a menu button 16, and page forward and page back buttons 17, 18. Color or black and white displays may be used for display 14, and all, part or none of the display may be configured as a touch screen. Moreover, different combinations of buttons may also be provided in the alternative. Thus, the configuration illustrated in FIG. 1 is merely exemplary in nature.

FIG. 1 also illustrates an exemplary electronic book 20 displayed on display 14. In connection with the display of an electronic book (or other electronic document), additional user controls, inputs and user-added display elements may also be displayed. For example, portions of the electronic book, including text and/or images, can be highlighted, e.g., as represented by underlined portion 22. Likewise, user-created comments may be displayed, e.g., as represented by comment 24. Furthermore, words or terms that are capable of being selected for the purpose of viewing a definition may be highlighted, e.g., as shown at 26. Moreover, as will become more apparent below, user-created contexts, or contextual references to be associated with a particular term definitions, may also be highlighted, e.g., as shown at 28.

It will be appreciated that a wide variety of highlighting mechanisms may be used to highlight portions of an electronic book, including the use of underlining, unique font faces, font sizes, font attributes, italics, bolding, capitalization, colors, patterns, grayscales, icons, outlines, etc. Moreover, different formats for user-created comments, e.g., bitmapped images, vector graphics, text strings, etc., may be used.

Figure 2:
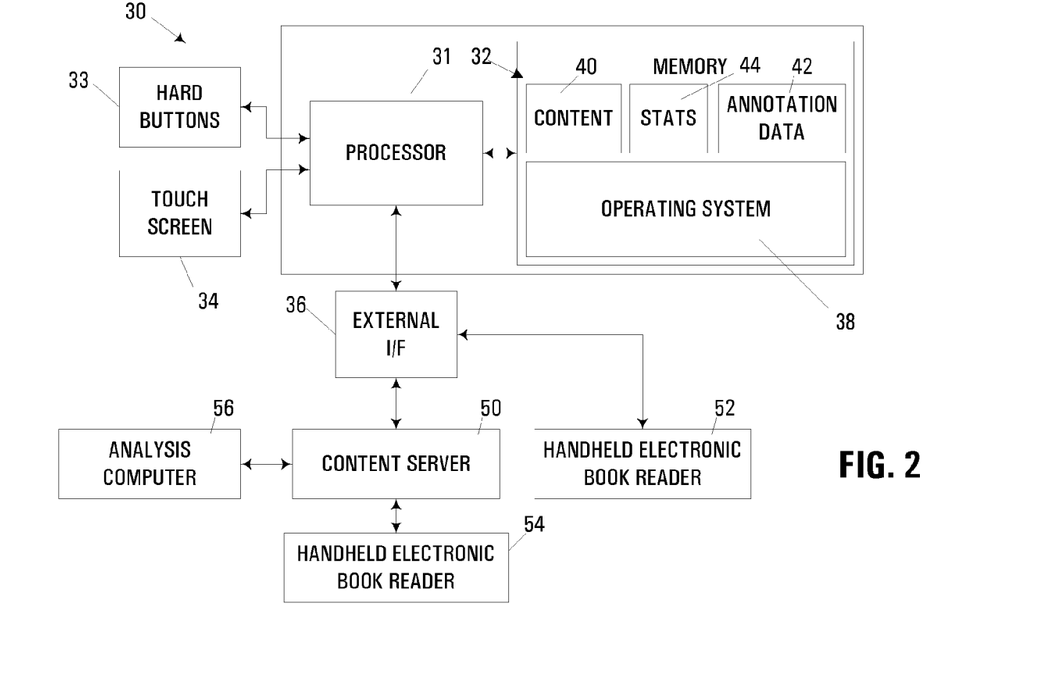
FIG. 2 is a block diagram of an exemplary hardware and software implementation of an electronic content collaboration system incorporating the handheld electronic book reader of FIG. 1.

Turning now to FIG. 2, an exemplary hardware and software environment for an electronic content collaboration system is illustrated. Specifically, an apparatus 30 suitable for implementing the electronic book functionality described herein is illustrated in the figure. For certain aspects of the invention, which will become more apparent below, apparatus 30 may represent practically any type of computer, computer system or other programmable electronic device, including a handheld electronic book reader, as well as a client computer, a server computer, a portable computer, a handheld computer, an embedded controller, etc. Moreover, in some implementations apparatus 30 may be implemented using one or more networked computers, e.g., in a cluster or other distributed computing system. However, for the purposes of the specific embodiments discussed hereinafter, apparatus 30 will be considered to be implemented as a dedicated handheld electronic book reader, e.g., similar to reader 10 described above in connection with FIG. 1.

Reader 30 typically includes at least one processor 31 coupled to a memory 32. Processor 31 may represent one or more processors (e.g., microprocessors), and memory 32 may represent the random access memory (RAM) devices comprising the main storage of reader 30, as well as any supplemental levels of memory, e.g., cache memories, non-volatile or backup memories (e.g., programmable or flash memories), read-only memories, etc. In addition, memory 32 may be considered to include memory storage physically located elsewhere in reader 30, e.g., any cache memory in a processor 31, as well as any storage capacity used as a virtual memory, e.g., as stored on any mass storage device or on another computer coupled to reader 30 via an external interface 36.

Reader 30 also typically receives a number of inputs and outputs for communicating information externally. For interface with a user or operator, reader 30 typically includes one or more user hard buttons 33 and a touch screen 34, which receives input as well as displays information to a user. User input may also be received via another computer interfaced with reader 30 over external interface 36.

For additional storage, reader 30 may also include one or more mass storage devices, e.g., a floppy or other removable disk drive, a hard disk drive, a direct access storage device (DASD), an optical drive (e.g., a CD drive, a DVD drive, etc.), and/or a tape drive, among others, as well as external memory such as flash memory, memory cartridges or cards, and the like. Furthermore, computer 36 may include an external interface, e.g., serial or parallel interconnects, USB interconnects, IEEE-1394 interconnects, telephone interconnects, Ethernet interconnects, wireless interconnects, etc., to permit the communication of information with other computers coupled to the reader. It should also be appreciated that reader 30 typically includes suitable analog and/or digital interfaces between processor 31 and each of components 32, 33, 34, and 36 as is well known in the art.

Reader 30 operates under the control of an operating system 38, and executes or otherwise relies upon various computer software applications, components, programs, objects, modules, data structures, etc. (e.g., content 40, annotation data 42 and statistics 44, among others). Moreover, various applications, components, programs, objects, modules, etc. may also execute on one or more processors in another computer coupled to reader 30 via a external interface 36. In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

To perform many of the hereinafter-described collaborative functions, reader 30 is typically capable of being interfaced with a number of external devices via interface 36. For example, to receive electronic books and other electronic content, as well as additional annotation data and the like, reader 36 may be coupled to a content server 50, e.g., via a private and/or public network. Moreover, reader 30 may interface with other electronic book readers, either directly (e.g., as for reader 52), or via intermediate electronics (e.g., as for reader 54).

Moreover, as will be discussed in greater detail below, additional computers, e.g., analysis computer 56 coupled to content server 50, may also be utilized in performing a number of the collaborative functions described herein. It should further be appreciated that the functionality allocated to any of components 50-56 may be combined into common hardware, or partitioned among additional hardware devices.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

The aforementioned environments may be utilized to implement a number of collaborative tools to enhance the utility of a handheld electronic book reader consistent with the invention. For example, annotation capabilities may be enhanced for an electronic book reader by permitting user-created contents to be associated with term definitions stored in an electronic dictionary. In this instance, a context refers to a passage from an electronic book or other electronic document that shows how a particular term is used in practice. A context may therefore include text surrounding a particular usage of a term, such that the context provides a user with an example of how a particular term is used. A created context may be associated with a particular electronic document, or in the alternative, may be associated with a particular user or system dictionary which may be maintained separately from an electronic document. As will become more apparent below, a context is typically created by selecting a portion of a displayed electronic document, and then directing a handheld device to store the selected portion as a context. In addition, view capability is also supported whereby one or more stored contexts, either user or system created, are displayed either collectively or selectively in connection with a particular term definition.

In addition, a context may be stored as a component of an annotation file, which functions much like a "Cliff Notes" for an electronic document. Additional annotation data, such as highlighting data and/or comment data, may also be incorporated into an annotation file along with one or more contexts.

An annotation file may be separately or jointly exportable along with an electronic document, such that the annotation data stored therein may be available for import into the same or a different reader. By providing the capability to export annotation data in the manner described herein, multiple users may be permitted to share the annotation data. Furthermore, it may be desirable in some implementations to associate specific annotation data with specific users, and allow a user to select among the annotation data generated by different users, or to display annotation data associated with multiple users at the same time, with some form of visual indication utilized to distinguish between the annotation data associated with different users. Alternate display representations may be utilized to distinguish the annotation data for particular users, including, for example, different colors, pattern, icons, font attributes, underlining, italics, etc.

The hereinafter described embodiments also enhance the collaborative capabilities of a handheld device by supporting usage tracking to monitor the usage of a handheld electronic book reader by a user. Through such usage tracking, page-based statistics may be generated, with such statistics associated with particular pages in an electronic document. Information such as the time during which a user views a page, the number of times a user reviews a page (i.e., views the page subsequent to a first time the user views the page), the total time spent reviewing a page, and/or the number of times a user powers off a device or closes a book while viewing a page, may be monitored.

Moreover, additional usage statistics such as definition-based usage statistics associated with term definitions may also be generated. In such instances, the number of times and amount of time spent viewing definitions of particular terms may be monitored. Moreover, when contexts are supported, the amount of time and number of contexts being viewed by a user may also be monitored in the manner described herein.

By tracking the aforementioned usage statistics, a number of useful applications can be envisioned. For example, usage statistics associated with multiple users may be tracked and collected by an analysis computer to compile the results. As will be appreciated by one of ordinary skill in the art having the benefit of the instant disclosure, an analysis computer may perform nothing more than collecting the statistics from one or more handheld devices, or may perform additional processing of the data to generate collective statistics or perform other, more detailed statistical analysis. Comparative performance for multiple users can then be analyzed if desired.

As another example, usage statistics may be utilized to determine whether and how to revise an electronic document. For example, if it is determined that a particular page or section of an electronic document takes too long to read, requires excessive review, and/or results in a user turning off the device, it may be determined that that page or section is too difficult, and needs to be simplified. As a result, an author of an electronic document might utilize usage tracking as described herein to facilitate authoring of an electronic document with the feedback of one or more users used to improve the content of the electronic document, much as "beta testers" are used in the software industry.

Usage statistics may also be utilized to assist an instructor in determining whether to revise a lesson plan. As an example, if it is determined that particular reading assignments take an inordinate amount of time, an instructor may revise a lesson plan to change the number of pages in a particular assignment.

Usage statistics may also be utilized in compliance measures to ensure that students are reading assigned material. For example, page statistics may be monitored to verify that a user has viewed each page in an assignment over a threshold period of time that verifies the user actually read the page. Even if the usage statistics are not constantly reviewed by an instructor, the fact that users or students recognize that their activities may be monitored may encourage better compliance with reading assignments.

Usage statistics may also be utilized to determine whether specific users such as students require supplemental assistance, e.g., if a particular user takes substantially longer to read a particular assignment than the other students in a class. Thus, an instructor may be able to identify students that are having problems with a particular subject matter and provide supplemental assistance such as additional tutoring to those users.

Other end uses for the usage statistics generated as described herein will be appreciated by one of ordinary skill in the art having the benefit of the instant disclosure.

While the embodiments discussed hereinafter incorporate both annotation and usage tracking capabilities, it will be appreciated that the various functions described herein may be implemented separately and/or independently in different implementations. Therefore, the invention is not limited to the specific combination of functions and capabilities discussed herein. Moreover, the embodiments discussed hereinafter will focus on an implementation in a classroom setting; however, it will be appreciated that the herein-described techniques may apply to a number of different applications of electronic book readers and the like. Furthermore, and in particular with regard to the usage tracking capabilities described herein, a number of the herein-described techniques may be utilized in environments other than in connection with handheld electronic book readers or other handheld devices, e.g., in desktop computers and the like.

Again referring to FIG. 2, a handheld electronic book reader consistent with the invention incorporates one or more electronic documents, as represented generally by content 40. In addition, to perform the aforementioned annotation capabilities, annotation data 42 is also stored in the reader. Furthermore, for the purposes of usage tracking, statistics 44 are also stored in the reader. Manipulation of this data is typically performed by operating system 38 in the context of a dedicated reader. In other environments, particularly with PDA's and the like, one or more applications may reside on top of the operating system to implement the herein-described functionality.

Figure 3:
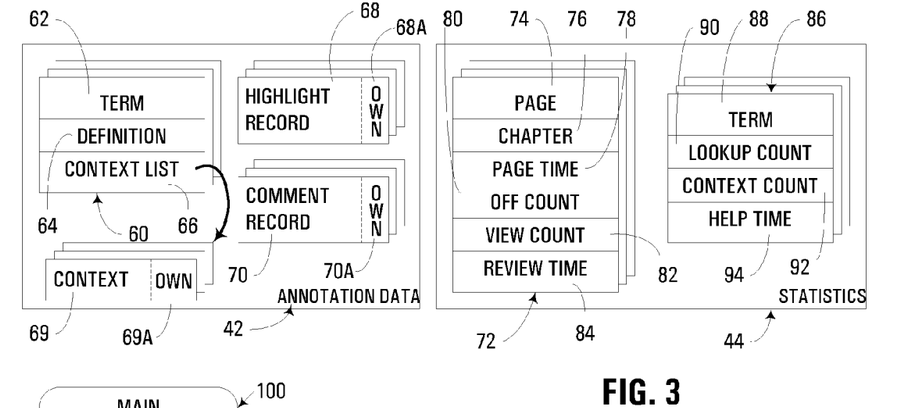
FIG. 3 illustrates annotation data and statistic data structures utilized in the handheld electronic book reader of FIG. 1.

FIG. 3 illustrates one implementation of the data structures defined within the annotation data 42 and statistics 44 of FIG. 2. Among the annotation data, a number of term definition records 60 may be provided, each of which including a defined term field 62 and a definition field 64 that respectively store a term and a definition may be displayed in response to a user request to display the definition for a term. In addition, a context list, pointed to by a pointer stored in field 66 may also be provided to store one or more contexts associated with a particular defined term. The context list may be represented by one or more context records 69, each including either a copy of a section of text or other information functioning as a context for a defined term, or a pointer to the actual content in an electronic document.

Annotation data 42 may also include highlight data, e.g., as represented by a plurality of highlight records 68 that define where in an electronic document highlighting should be applied. Furthermore, one or more comments may be defined by a plurality of comment records 70. The highlighting may be generated by a user, for example, by selecting sections of an electronic document and applying highlighting thereto, in a manner known in the art. Furthermore, comments may be represented by handwritten notes applied by a user, or by information obtained by other means such as through interaction with an actual keyboard or a simulated keyboard displayed on a touchscreen, as is also known in the art. In this regard, comment records may be represented by text strings, or by other types of information, such as a bit map or vector graphic image representative of the handwritten notes made by a user.

In certain embodiments of the invention, annotation data from multiple users may be compiled into an annotation file to permit collaborative annotation by multiple users. To this extent, it may be desirable to associate, with each context, highlight and comment record, an identifier for the owner or user that created such record. Accordingly, each context record, highlight record and comment record 69, 68 and 70 may include a respective owner field 69A, 68A, and 70A to indicate the creator of that particular record.

As described above, statistics 44 may include both page-based statistics and definition-based statistics, as well as other statistics for which it may be desirable to track in monitoring the usage by a user. For example, one or more page records 72 may be defined to store a plurality of page-based statistics. For each record 72, a page identifier field 74 may be provided, as well as an optional chapter identifier field 76 that identifies where in the electronic document the page is located. Other identification information that partitions a page into a particular section or other subset of a document may be used in the alternative.

Each page record 72 also includes a page time field 78 that stores the total amount of time a user spends viewing a page. An off count field 80 stores the number of times a user turns off or powers off a reader while viewing the page, and/or the number of times the user otherwise closes the electronic book while viewing the page. A review count field 82 stores the number of times, subsequent to the first time, that a user views a particular page, and a review time field 84 stores the amount of time a user spends reviewing a page.

As far as definition-based statistics, such statistics may be stored in definition statistic records 86, each including a term field 88 identifying a defined term, as well as a lookup count field 90, a context count field 92 and a help time field 94. Field 90 stores the number of times a definition for a defined term is accessed, while field 92 stores the number of contexts that are viewed in association with the definition. Field 94 stores the total amount of time a user spends viewing a definition and/or one or more contexts associated therewith.

It will be appreciated that additional usage statistics may be stored as part of statistics 44. Moreover, any number of data structure implementations may be utilized to store the information illustrated in FIG. 3, e.g., tables, linked lists, etc.

Figure 4:
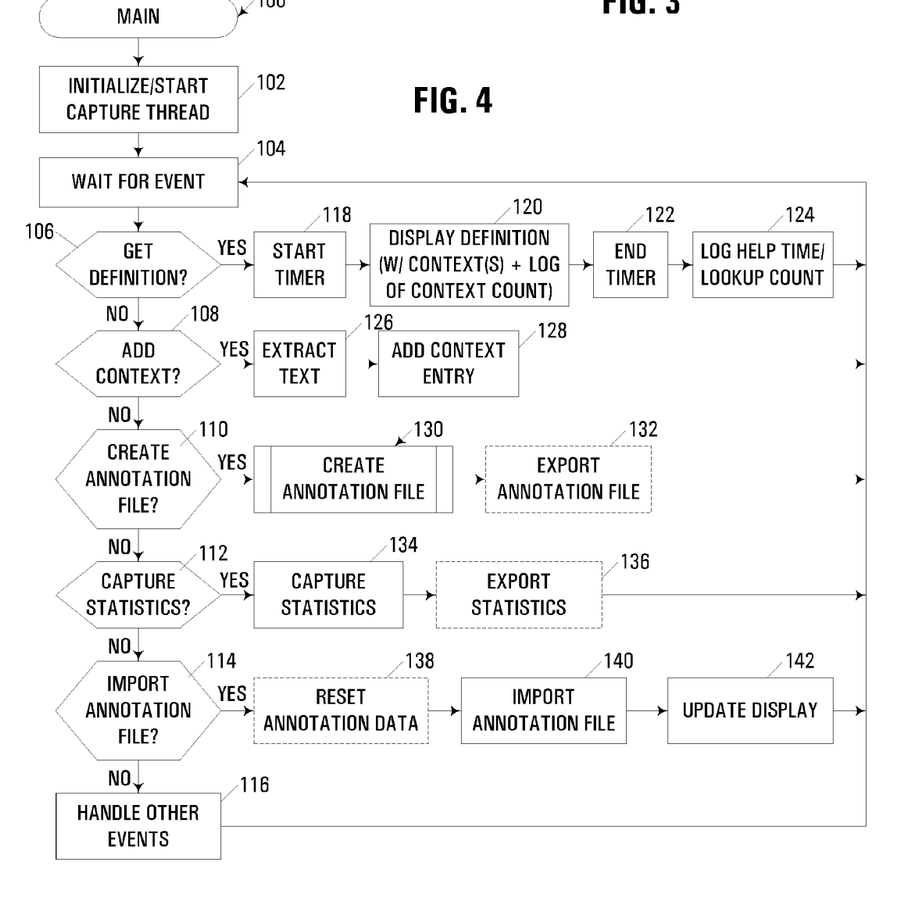
FIG. 4 illustrates the program flow of a main routine executed by the handheld electronic book reader of FIG. 1.

FIG. 4 next illustrates a main routine 100 executed by a handheld electronic book reader consistent with the invention. Routine 100 is illustrated as an event-driven routine, although it will be appreciated that other programming models, e.g., procedural or object-oriented models, may be used in the alternative.

Routine 100 begins in block 102 by performing various initialization operations, including starting a capture thread that is utilized in connection with a portion of the usage tracking functionality described herein. Also, at this time, an electronic book may be loaded into the memory and/or displayed on the reader. Next, block 104 initiates an event-driven loop. A number of events relevant to the herein-described functions are detected and handled in blocks 106, 108, 110, 112 and 114. Other events, which are not relevant to the functionality described herein, are handled in block 116 in a conventional manner, after which control returns to block 104 to wait for additional events.

As mentioned above, a number of events associated with annotation and usage tracking are detected in blocks 106-114. One such event, a get definition event, is detected in block 106, and handled by passing control to block 118 to start a timer that is used to monitor the amount of time a user spends viewing a particular definition. A get definition event may be initiated, for example, in response to a user selecting a particular defined term.

Once the timer is started in block 118, control passes to block 120 to display the relevant definition, including one or more contexts (if provided). The definition is taken from the definition record 60 for that term (FIG. 3). Block 120 also logs any accesses to one or more contexts associated with a definition to maintain the context count field 92 within the definition statistic record 86 for a particular defined term (FIG. 3). It will be appreciated that all the contexts associated with a particular term may be displayed together, or in the alternative, user input may be received to scroll or toggle through multiple contexts.

Once a user is finished viewing a definition, block 120 passes control to block 122 to end the timer that was started in block 118. The elapsed time is then used in block 124 to log the help time for the definition, typically by adding the view time calculated by the timer of blocks 118 and 122 to any previous elapsed time stored in help time field 94 (FIG. 3). In addition, the lookup count for the definition is also logged in block 124 by incrementing the value stored in lookup count field 90 (FIG. 3). Control then returns to block 104 to wait for additional events.

Another event, which is detected in block 108, is an add context event. Typically, this event is generated in response to a user selecting text or other information in an electronic document, and selecting a create context operation, e.g., via a pop-up or pull-down menu displayed on the reader when the text is selected. Material to be incorporated into a context may include text data, image data, animation data, video data, audio data, etc. Moreover, selection may incorporate practically any known manner for selecting information via a user interface, including various combinations of user gestures input via a touchscreen, a keyboard, a hard button, and combinations thereof.

In response to such event, block 108 passes control to block 126 to extract the relevant text or other information selected by a user. Then, a context record 69 (FIG. 3) is added to the context list for the relevant definition in block 128. In addition, it should be appreciated that a user will typically need to select a particular term with which to associate the context. Any number of user selection operations, e.g., selecting from a list, and/or analyzing the selected text to identify one or more terms that are associated with definitions, may be used to determine with which term a particular context should be associated.

Another event that may be detected in routine 100 is a create annotation file event, which is detected in block 110 and handled by calling a create annotation file routine 130. A create annotation file event may be generated, for example, in response to user selection from a menu when it is desired to compile the annotation data into an annotation file, typically for export. Therefore, as shown in block 132, it may be desirable to optionally export the annotation file to a location external to a reader. In the alternative, creating an annotation file and exporting the annotation file may be handled in separate events.

It will also be appreciated that creating an annotation file may generate any number of data structures or formats that are readable by an external device for the purposes of properly decoding the annotation data stored in the file.

Also, a user identifier may be associated with annotation data in the file for combining the data with that of other users.

Another event that may be detected by routine 100 is a capture statistics event, which is detected in block 112 and handled by passing control to block 134 to capture the usage statistics, and optionally export those statistics to another device as shown in block 136. Capturing the statistics may be initiated by a user-selected menu option, or in other manners known in the art for receiving user input. By capturing the statistics, the current information stored in the statistics 44 of FIG. 3 may be reformatted, if necessary, into a suitable format for export. In other embodiments, the statistics may not be exported, but may be viewed and processed while still stored on the handheld device. As a result, the capture statistics event may also be utilized to generate a display of the usage statistics on the handheld device.

Yet another event handled by routine 100 is an import annotation file event, which is detected in block 114 and handled by passing control to block 138 to optionally reset the annotation data stored in the handheld device, and then to block 140 to import a selected annotation file. Subsequent to importing the annotation file, the display may be updated at block 142, e.g., to implement the new highlighting and add any comments supplied in the imported annotation data.

In some implementations, resetting of the annotation data may not be required, particularly if annotation data associated with multiple users is to be stored and displayed in association with the same electronic document in the same handheld device. It should be appreciated that annotation files may be imported sequentially or may be collected and imported collectively into a handheld device. Moreover, it should be appreciated that an import annotation file event may be generated in a number of manners, including selecting from among a plurality of available annotation files, or inputting a specific file name. In other embodiments, importing of an annotation file may be initiated externally from the handheld device, and without receiving input from a user via the reader. Other modifications will be apparent to one of ordinary skill in the art.

It should also be appreciated that additional events may also be detected and handled in routine 100 consistent with the invention. Thus, the list of events discussed in connection with FIG. 4 is not exclusive.

Figure 5:
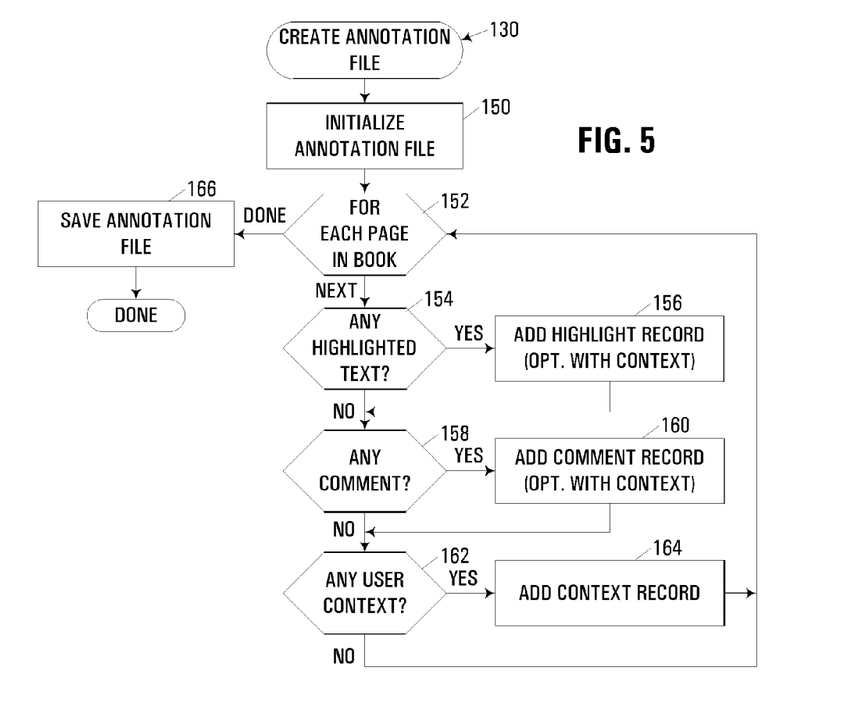
FIG. 5 illustrates the program flow of the create annotation file routine referenced in FIG. 4.

FIG. 5 illustrates create annotation file routine 130 in greater detail. Routine 130 begins in block 150 by initializing an annotation file, e.g, to generate a desired file format with no initial annotation data stored therein. Next, block 152 initiates a loop to process each page in a book or other electronic document.

For each such page, control passes to block 154 to determine whether any text or portion of a document is highlighted on that page, e.g., by searching through the highlight data in annotation data 42 of FIG. 3. If so, control passes to block 156 to add one or more highlight records to the annotation file. In addition, in some implementations it may be desirable to incorporate contextual information such as surrounding text or other information, along with the highlighted information. Also, rather than storing the actual text, a pointer to the appropriate text may be used.

If no highlighted text is present on a page, or after completion of block 156, control next passes to block 158 to determine whether any comments are associated with a particular page. If so, control passes to block 160 to add comment record(s) to the annotation file. In addition, any contextual information may optionally be incorporated into the comment record. Then, upon completion of block 160, or if no comments are present on the current page, control passes to block 162 to determine whether any user-created contexts are associated with the page. If so, block 162 passes control to block 164 to add context record(s) to the annotation. Control then returns to block 152 to process additional pages in the book. Also, if no user contexts are associated with a particular page, block 162 passes control directly to block 152.

Upon processing of each page in the electronic document, block 152 passes control to block 166 to save the annotation file. Routine 130 is then complete.

It should be appreciated that other implementations may create an annotation file in other manners. For example, user-created contexts may not be associated with specific pages, and may be processed outside of the loop initiated by block 152. In addition, in some implementations creation of an annotation file may consist of nothing more than copying the annotation data 42 without any reformatting. Other modifications will be apparent to one of ordinary skill in the art.

Figure 6:
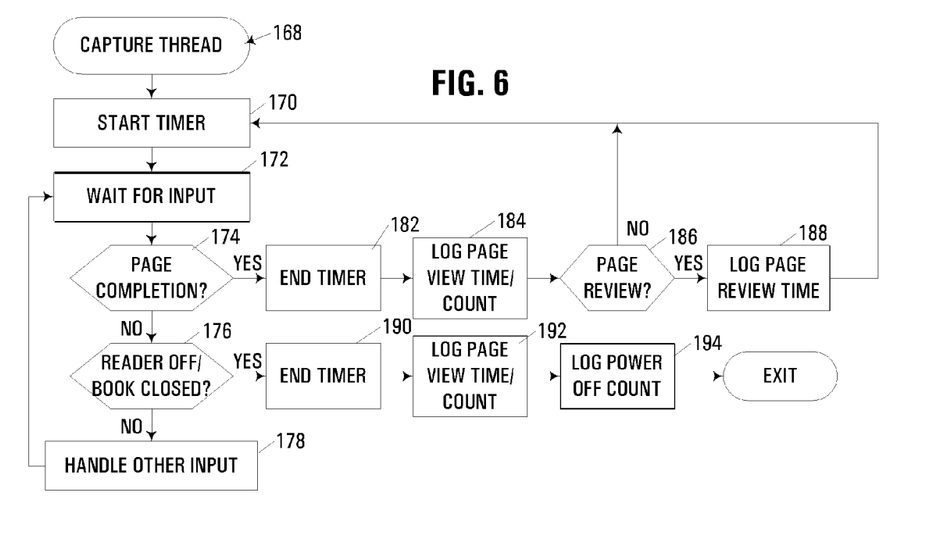
FIG. 6 illustrates the program flow of the capture thread routine referenced in FIG. 4.

FIG. 6 next illustrates a capture thread 168 that is initialized as described above in connection with block 102 of FIG. 4. The capture thread is utilized to monitor various usage-related events to track user navigation through an electronic document. The result is the generation of one or more page-based usage statistics reflective of how a user navigates through an electronic document.

Thread 168 begins in block 170 by starting a timer for the current page being viewed in the electronic document. Then, in block 172, the thread waits for user input that may be relevant for generating page-based usage statistics. Block 174 detects user input associated with a page completion, while block 176 detects user input related to either a reader being turned off or an electronic document or book being closed by the user, both of which reflect that the user is no longer viewing an electronic document. Additional user input, which is not relevant to page-based usage tracking, is handled, if necessary, in block 178. Control then returns to block 172 to wait for other input.

A page completion, as detected by block 174, will be initiated in response to a number of types of user input. For example, if a user selects a next or previous page, or attempts to directly access another page, a page completion may be detected. Other instances where a user is no longer viewing a current page subsequent to the input may also trigger a page completion detection consistent with the invention.

Whenever completion of a page is detected, block 174 passes control to block 182 to end the timer, and then to block 184 to log the page view time, typically by adding the elapsed time calculated by the timer to any amount stored in the page time field 78 for the statistic record 72 for the current page (FIG. 3). In addition, a viewing of the page is logged by incrementing the value stored in the view count field 82 for the record 72 for that page (FIG. 3).

Next, block 186 determines whether the page is being reviewed, e.g., by detecting a value in the view count field greater than one. If it is determined that this is the first viewing of the page, control returns to block 170 to start the timer for another page (as, presumably, other program code handles the user input that indicates page completion, and thus initiates the display of a new page). Otherwise, control passes to block 188 to log the review time for the page, e.g., by adding the elapsed time calculated by the timer to the value stored in the review time field 84 for the record 72 for the page (FIG. 3). Control then returns to block 170 to start the timer for a new page.

Detection of the reader being turned off or the book being closed is handled in block 176 by passing control to block 190 to end the timer started above in block 170. Other input that results in a user no longer viewing a particular electronic document may also be used to trigger block 176.

Once the timer is stopped, control passes to block 192 to log both the page view time and count for the current page. In addition, block 194 is called to log the power off by incrementing the value stored in the off count field 80 for the record 72 for the current page. Thread 168 then terminates, or optionally returns to block 170, e.g., if another book is opened.

It will be appreciated that page-based usage statistics may be collected in other manners, and that other organizational constructs of a document may be used to delimit usage statistics consistent with the invention. In still other embodiments, other organizational constructs may be monitored by collecting usage statistics from multiple pages in a particular organizational breakpoint. For example, chapters or sections may be tracked by collecting the usage statistics for the pages within such chapters or sections. Other modifications will be apparent to one of ordinary skill in the art.

Figure 7:
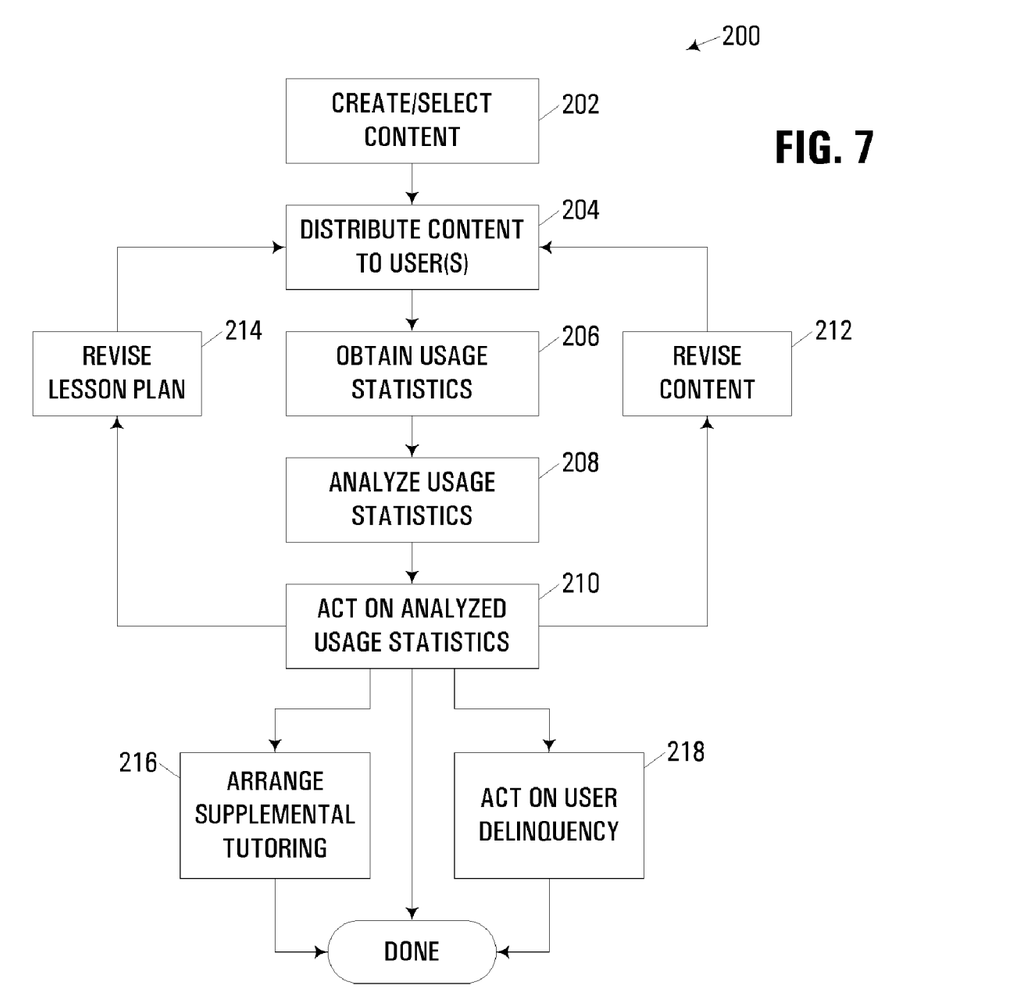
FIG. 7 illustrates an exemplary process for utilizing usage statistics in connection with electronic content in a manner consistent with the invention.

As discussed above, upon collection of usage statistics in the manner described herein, the statistics may be utilized in a number of environments for beneficial purposes. FIG. 7, for example, illustrates a number of such purposes via a flowchart 200. These purposes are focused herein on an educational or classroom-type setting, although it should be appreciated that the invention is not limited to this particular setting.

As shown in block 202, for example, an instructor may create or select content for reading by one or more students or users. Then, as shown in block 204, the content may be distributed to the users, such that the content is loaded into the handheld devices for such users. Next, block 206 obtains usage statistics from those users after those users have presumably viewed the content.

Next, in block 208, the usage statistics are analyzed by an instructor or another person working in connection with the instructor. Then, as shown in block 210, the instructor or other person acts on the analyzed usage statistics in a number of ways, discussed below.

For example, where the content is being created by an instructor, or any other author for that matter, the usage statistics may be utilized in revising the content, e.g., to simplify certain passages, make certain passages more understandable, etc., as shown in block 212. Once the content is revised, the content may optionally be redistributed to users as shown by the arrow from block 212 to block 204. The usage statistics in this application are therefore utilized to assist an author in improving the quality of authored content based upon the usage statistic feedback generated by one or more users.

Also, if the content is associated with a particular lesson plan, the lesson plan may be revised as shown in block 214 based upon the usage statistics. For example, if an instructor determines that a particular reading assignment takes too long to read based upon the usage statistics of one or more students, the instructor may modify the lesson plan to shorten the assignment. Also, it should be appreciated that revising a lesson plan may affect future assignments for a current group of students, or may affect future students in subsequent classes. Also, as shown by the arrow from block 214 to block 204, revision of a lesson plan may require redistribution of the content to users. In the alternative, no such redistribution may occur.

As represented in block 216, the usage statistics may also be utilized to determine whether a particular user requires supplemental tutoring or instruction. For example, if a particular user takes longer to read a particular passage, or has a higher rate of review of certain pages, the user may have difficulty in comprehending the subject matter, and as such, an instructor may desire to provide supplemental assistance to that user.

Another action that may occur is acting on user delinquency as shown in block 218. For example, if it is determined that the pages in a particular assignment were not viewed for time indicative of some minimum time it would take a normal person to read a particular page, an instructor may determine that a particular user did not read an assignment, and take appropriate corrective action. Also, as discussed above, just the fact that an instructor is monitoring usage by students may encourage the students to follow all assignments.

It will be appreciated that the aforementioned uses of usage data need not be implemented in the same environment. Moreover, other utilizations of usage data will be appreciated by one of ordinary skill in the art having the benefit of the instant disclosure.

Other modifications will be apparent to one of ordinary skill in the art. Therefore, the invention lies in the claims hereinafter appended.

What is claimed is:

1. A method of monitoring usage of an electronic document, the method comprising: tracking usage of a handheld electronic book reader by a user when viewing a plurality of pages in an electronic document stored in the handheld electronic book reader, wherein the user is a student, and wherein the electronic document includes educational material from a reading assignment that has been assigned to the student; for each of the plurality of pages, generating at least one usage statistic associated with that page based upon the tracked usage; and using the usage statistic to determine whether the student has read the reading assignment, and further comprising determining whether to revise at least one of the electronic document and a lesson plan with which the electronic document is associated based upon the usage statistic.

2. The method of claim 1, wherein tracking usage of the handheld electronic book reader by the user includes at least one of tracking how long the user views a selected page among the plurality of pages, tracking how many times the user views a selected page among the plurality of pages, tracking how long the user views a selected page among the plurality of pages subsequent to a first viewing of the selected page, and tracking whether the user powers the handheld electronic book reader off while viewing a selected page among the plurality of pages.

3. The method of claim 1, wherein the at least one usage statistic is selected from the group consisting of page view time, power off count, page review count, page review time, and combinations thereof.

4. The method of claim 1, further comprising:
tracking usage of a second handheld electronic book reader by a second user when viewing a second copy of the electronic document that is stored in the second handheld electronic book reader;
generating at least one usage statistic for the second user; and receiving in an analysis computer the usage statistics for the first and second users from the first and second handheld electronic book readers.

5. The method of claim 1, further comprising using the usage statistic to determine whether the user needs supplemental assistance.

6. A method of monitoring usage of an electronic document, the method comprising: tracking usage of a handheld electronic book reader by a user when viewing an electronic document stored in the handheld electronic book reader, including tracking user access to at least one term definition stored in the handheld electronic book reader when viewing the electronic document; and generating at least one usage statistic for the user based upon the tracked usage, wherein tracking user access to at least one term definition includes tracking how many times the user views the term definition, and further comprising determining whether to revise at least one of the electronic document and a lesson plan with which the electronic document is associated based upon the usage statistic.

7. The method of claim 6, wherein tracking user access to at least one term definition includes tracking how long the user views the term definition.

8. The method of claim 6, wherein the term definition is associated with at least one context, and wherein tracking user access to at least one term definition includes tracking user access to the context.

9. A method of monitoring usage of an electronic document, the method comprising:

tracking usage of a first handheld electronic book reader by a first user when viewing a first copy of an electronic document stored in the first handheld electronic book reader;

tracking usage of a second electronic book reader by a second user when viewing a second copy of the electronic document stored in the second handheld electronic book reader;

generating at least one usage statistic for each of the first and second users based upon the tracked usages;

receiving in an analysis computer the usage statistics for the first and second users from the first and second handheld electronic book readers; and using the usage statistics for the first and second users to revise at least one of the electronic document and a lesson plan with which the electronic document is associated, wherein the electronic document comprises educational material, and wherein the first and second users are students assigned to read the educational material.

10. A method of monitoring usage of an electronic document, the method comprising: tracking usage of a handheld electronic book reader by a user when viewing an electronic document stored in the handheld electronic book reader, wherein the user is a student, and wherein the electronic document comprises educational material assigned to the student; generating at least one usage statistic for the user based upon the tracked usage; and using the usage statistic to determine whether the user needs supplemental assistance with the educational material, and further comprising determining whether to revise at least one of the electronic document and a lesson plan with which the electronic document is associated based upon the usage statistic.

* * * * *